(12) United States Patent
Tso et al.

(10) Patent No.: US 7,691,633 B2
(45) Date of Patent: Apr. 6, 2010

(54) ULTRA HIGH MOLECULAR WEIGHT POLYETHYLENE FRACTIONS HAVING NARROW MOLECULAR WEIGHT DISTRIBUTIONS AND METHODS OF MAKING AND USING THE SAME

(75) Inventors: Chung C. Tso, Bartlesville, OK (US); Melvin Hildebrand, Bartlesville, OK (US); Paul J. DesLauriers, Bartlesville, OK (US); Youlu Yu, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 207 days.

(21) Appl. No.: 11/766,518

(22) Filed: Jun. 21, 2007

(65) Prior Publication Data
US 2007/0249053 A1 Oct. 25, 2007

Related U.S. Application Data

(62) Division of application No. 10/754,373, filed on Jan. 9, 2004, now Pat. No. 7,241,620.

(51) Int. Cl.
*C08F 210/02* (2006.01)
*G01N 30/02* (2006.01)
*C08F 6/12* (2006.01)

(52) U.S. Cl. .......................... 436/8; 73/64.54; 210/656; 526/348; 526/352

(58) Field of Classification Search ............ 436/8; 73/64.54; 526/348, 352; 210/656
See application file for complete search history.

(56) References Cited

U.S. PATENT DOCUMENTS

| 5,559,190 | A | 9/1996 | Nubel et al. |
| 6,294,388 | B1 | 9/2001 | Petro |
| 6,635,728 | B2 * | 10/2003 | Liu ............................ 526/161 |
| 7,241,620 | B2 | 7/2007 | Tso et al. |
| 2002/0035228 | A1 | 3/2002 | Martin et al. |
| 2004/0260046 | A1 | 12/2004 | Smith et al. |

FOREIGN PATENT DOCUMENTS

| EP | 0 372 735 A1 | 6/1990 |
| EP | 1 197 500 A1 | 4/2002 |
| JP | 7-316228 A | 12/1995 |

OTHER PUBLICATIONS

Hawker et al, A New Convergent Approach to Monodisperse Dendritic Macromolecules, J. Chem. Soc., Chem. Commun., 1990, pp. 1010-1013.*
A.C. de Kok et al, Journal of Liquid Chromatography, 5(5), 807-817 (1982).*
Altgelt, K. H., et al., "Polymer Fractionation," Chapter B.4: Gel Permeation Chromatography, 1967, pp. 123, 153-158 + cover, Academic Press, New York-London.
Baker-Williams, et al., "Fractionation," Chapter 8, Sections 8.1-8.4, pp. 121-130, (1988).
Baker, C. A., et al., "Journal of the Chemical Society," Part II, 456. A New Chromatographic Procedure and its Application to High Polymers, 1956, pp. 2353-2362 + cover & table of contents (2 pgs.), The Chemical Society, London.
English language translation of JP 7-316228-A, published Dec. 5, 1995, 19 pgs., 2006-The Thompson Corporation.
Helmstedt, M., et al., "Determination of molecular dimensions of linear polyethylene by light scattering," Polymer, 2001, pp. 4163-4172, vol. 42, Elsevier Science Ltd.
Hsieh, Eric T., et al., "Intermolecular Structural Homogeneity of Metallocene Polyethylene Copolymers," J. Macromol. Sci.-Phys., 1997, pp. 615-628, vol. B36, No. 5, Marcel Dekker, Inc.
"SciFinder," Dec. 17, 2003, 9 pgs.
Wasielewski, Marek, "Calibration of the GPC system for molecular characteristics of UHMWPE," Polimery, 1994, pp. 623-625, vol. 39, No. 10, Warsaw, Poland.
Foreign communication from a counterpart application—International Search Report and Written Opinion, PCT/US2005/000227, Apr. 26, 2005, 7 pgs.

* cited by examiner

*Primary Examiner*—Fred M Teskin
(74) *Attorney, Agent, or Firm*—Conley Rose, P.C.; Rodney B. Carroll; Cheryl L. Huseman

(57) ABSTRACT

Polymer fractions such as polyethylene fractions can be produced that have a PDI less than about 2.3 and a $M_w$ greater than about 1,000,000 g/mol, 3,000,000 g/mol, or 6,000,000 g/mol. Such polyethylene fractions are separated from a UHMWPE parent polymer by first dissolving the parent polymer in a relatively good solvent. The conditions employed for such dissolution are selected to reduce the degradation of the parent polymer. The resulting parent solution is transported into a fractionation column in which a support is disposed. The fractionation column is thereafter operated at conditions effective to form a precipitate on the support comprising the desired polyethylene fraction. The polyethylene fraction may then be recovered from the fractionation column by repeatedly displacing a solvent/non-solvent mixture into the column to dissolve the polyethylene fraction. The relative concentrations of the solvent and the non-solvent are based on a solvent gradient profile of the polyethylene parent polymer.

23 Claims, 4 Drawing Sheets

ULTRA HIGH MOLECULAR WEIGHT POLYETHYLENE FRACTIONS HAVING NARROW MOLECULAR WEIGHT DISTRIBUTIONS AND METHODS OF MAKING AND USING THE SAME

CROSS-REFERENCE TO RELATED APPLICATIONS

This is a Divisional Application of U.S. patent application Ser. No. 10/754,373, filed Jan. 9, 2004, now U.S. Pat. No. 7,241,620, and entitled "Ultra High Molecular Weight Polyethylene Fractions Having Narrow Molecular Weight Distributions and Methods of Making and Using the Same," which is hereby incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to polymer production and characterization, and more particularly to producing ultra high molecular weight polyethylene (UHMWPE) fractions having narrow molecular weight distributions for use as reference standards on analytical tools such as a gel permeation chromatography tool.

BACKGROUND OF THE INVENTION

There is an ongoing need to develop and optimize polymeric materials for a wide range of applications. Various polymer characterization techniques have been developed to determine the properties and compositions of such polymeric materials, allowing researchers to better assess their next step in obtaining useful polymeric materials. For example, gel permeation chromatography (GPC) is one type of size exclusion chromatography (SEC) that is commonly employed to assess the molecular mass and molecular mass distributions of polymers. Differential scanning calorimetry (DSC) is a technique used to study the thermal transitions such as the glass transition that a polymer experiences as its temperature changes. There are many other techniques known in the art for evaluating the performance of polymeric materials such as rheology measuring techniques and light scattering techniques.

Reference standards are required to calibrate or test the instruments employed for such polymer characterization techniques. The most useful reference standards for calibrating instruments such as gas permeation chromatographs have relatively narrow molecular-weight distributions. Unfortunately, minimizing the molecular weight distribution of polyethylene, which is one of the most widely used polymers, has proven to be very difficult. The lack of good polyethylene reference standards limits the ability of researchers to accurately determine the properties of polymeric materials.

A need therefore exits to develop polymer fractions, for example polyolefin fractions and more specifically polyethylene fractions, that would serve as good reference standards for polymer characterization instruments. In particular, it is desirable to develop polyethylene fractions having narrower molecular weight distributions.

SUMMARY OF THE INVENTION

Polymer compositions or fractions and in particular polyethylene fractions can be produced that have a polydispersity index (PDI) less than about 2.3 and a weight-average molecular weight ($M_w$) greater than about 1,000,000 g/mol, 3,000,000 g/mol, or 6,000,000 g/mol. Such polyethylene fractions are separated from an ultra high molecular weight polyethylene (UHMWPE) parent polymer by first dissolving the parent polymer in a relatively good solvent to form a polyethylene parent solution. The conditions employed for such dissolution are selected to reduce the degradation of the UHMWPE parent polymer. In particular, the UHMWPE parent polymer and the solvent may be agitated at a rate of from about 55 rpm to about 65 rpm while heating the mixture at a temperature ranging from about the melting point temperature of the UHMWPE parent polymer to about 30° C. above its melting point temperature. This agitation and heating of the mixture may be performed for a period of time effective to dissolve substantially all of the UHMWPE parent polymer in the solvent. After this dissolution step, the resulting parent solution is then transported into a fractionation column in which a support, e.g., glass beads, is disposed. The fractionation column may be scaled-up in size to produce relatively large quantities of the polyethylene fractions.

The fractionation column is thereafter operated at conditions effective to form a precipitate on the support comprising one or more desired polyethylene fractions. That is, the temperature of the column is lowered to a temperature less than about 40° C. at a rate of from about 1° C./hr to about 0.5° C./hr. The polyethylene fractions may then be recovered from the fractionation column by displacing a recovery solvent/non-solvent mixture into the column. The relative concentrations of the solvent and the non-solvent are based on a solvent gradient profile of the polyethylene parent polymer. The temperature of the column is raised to a temperature ranging from about the melting point temperature of the UHMWPE parent polymer to about 30° C. above its melting point temperature, thereby heating the solvent/non-solvent mixture. The fractionation column is maintained at that temperature while a portion of the polyethylene parent polymer is allowed to dissolve in the solvent/non-solvent mixture. The mixture subsequently can be displaced from the fractionation column and combined with a precipitating agent to recover the polyethylene fraction dissolved therein. The foregoing steps related to the recovery of the polyethylene fractions can be repeated until the solvent/non-solvent mixture exiting the fractionation column is substantially absent of the polyethylene precipitate.

DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In accordance with an embodiment, a polymer composition or fraction, for example a polyolefin fraction and more specifically polyethylene fraction suitable for use as a reference standard has a polydispersity index (PDI) less than about 2.3, alternatively less than about 2.2, alternatively less than about 2.1, alternatively less than about 2.0, alternatively less than about 1.9, alternatively, less than about 1.8, alternatively less than about 1.7, alternatively less than about 1.6, or alternatively less than about 1.5. In an embodiment, a polyethylene fraction suitable for use as a reference standard has a polydispersity index (PDI) less than about 2. While it should be understood the disclosure herein may be applied to a variety of crystalline or semi-crystalline polymers (e.g., parent polymers), the majority of the disclosure is focused on embodiments to produce one or more polyethylene fractions. As used herein, the term "polyethylene fraction" refers to a fraction or "cut" isolated from a polyethylene parent polymer—that is a portion, as defined by PDI and molecular weight, of polyethylene polymer that is less than that of the entire polyethylene parent polymer. The PDI is an index of the breadth of the molecular-weight distribution (MWD) of a polymer and is equivalent to the weight-average molecular weight of the polymer divided by the number-average molecular weight of the polymer (i.e., $M_w/M_n$). In an embodiment, the polyethylene fraction is an ultra high molecular weight polyethylene (UHMWPE) fraction having a molecular weight greater than about 1,000,000 g/mol, alternatively greater than about 3,000,000 g/mol, or alternatively greater than about 6,000,000 g/mol.

Figure 1:
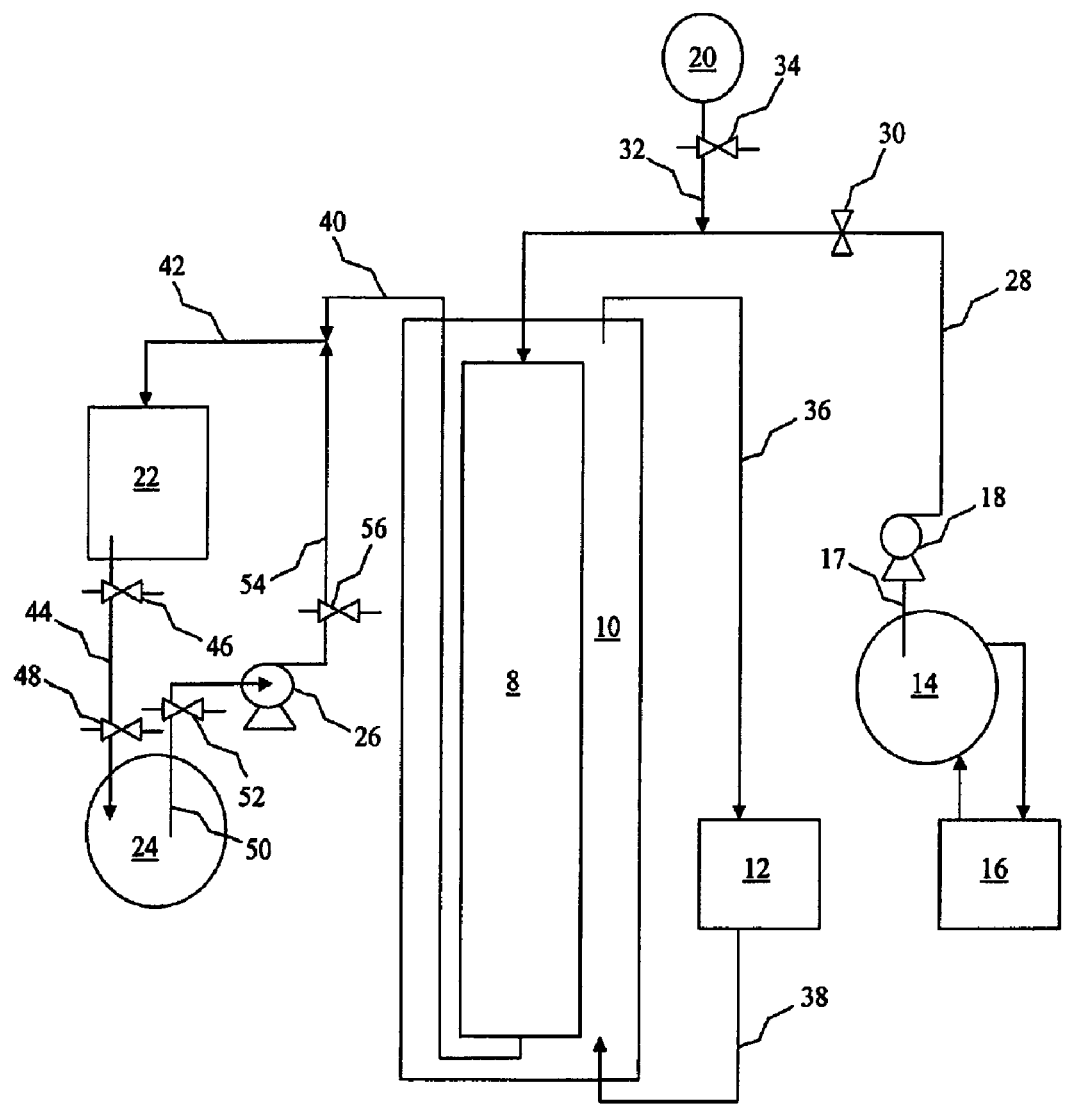
FIG. 1 illustrates a side plan view of an embodiment of a fractionation system used to produce a UHMWPE fraction having a relatively narrow molecular weight distribution, wherein the fractionation system is shown as it appears during the loading of a parent polyethylene solution.
Figure 2:
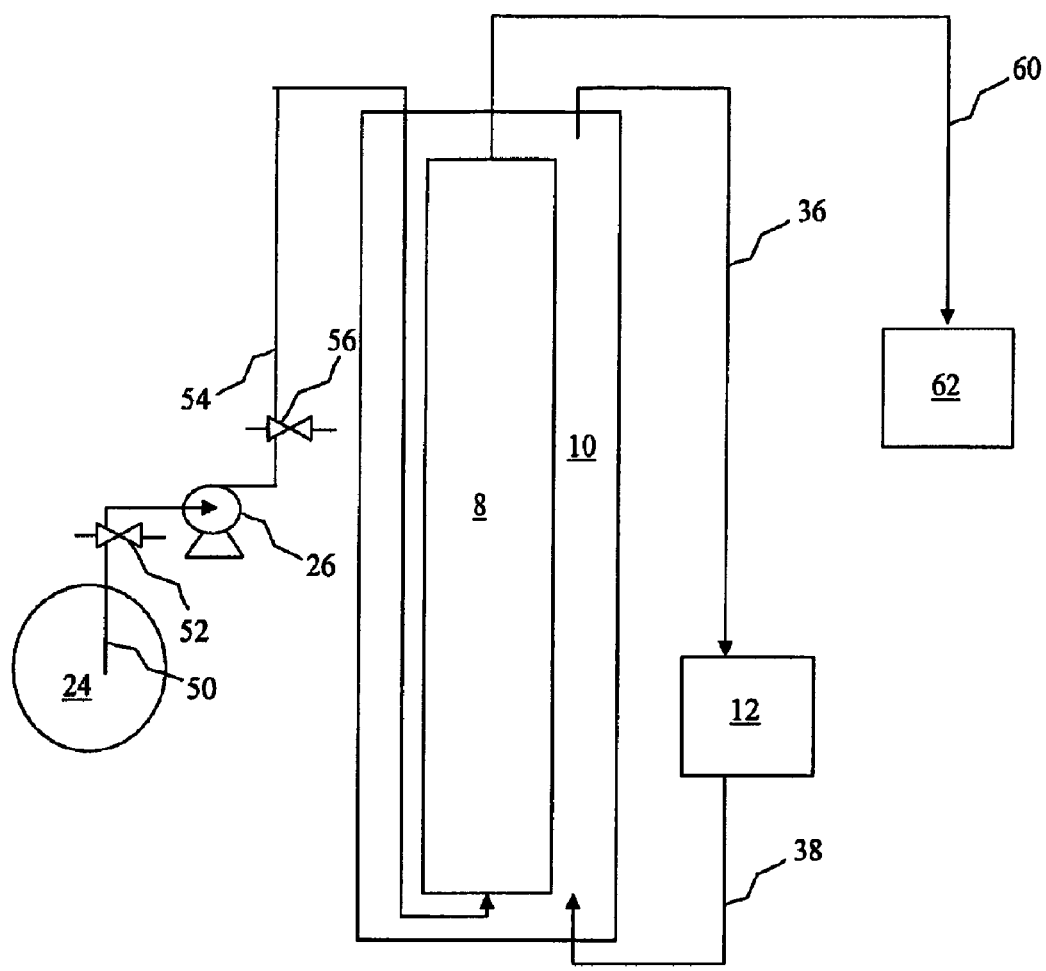
FIG. 2 illustrates a side plan view of the fractionation system as it appears during the recovery of the UHMWPE fraction from the fractionation column.

In an embodiment, one or more UHMWPE fractions may be produced from a polyethylene parent polymer using the fractionation system shown in FIGS. 1 and 2. As shown in FIG. 1, the fractionation system includes a fractionation column 8 having a heating/cooling jacket 10 and a corresponding heating/cooling bath 12. In an embodiment, fractionation column 8 may be a scaled-up column, for example a cylindrical column. As used herein, "scaled-up" refers to the size of the column being sufficient to produce greater than about 1 gram of one or more UHMWPE fractions, alternatively greater than about 2 grams of one or more UHMWPE fractions, alternatively greater than about 3 grams of one or more UHMWPE fractions. The fractionation system also includes a jacketed dissolution vessel 14 and a corresponding heating bath 16, a loading pump 18, a chase vessel 20, a solvent cooling unit 22, a solvent vessel 24, and a fractionation pump 26. Cooling unit 22 contains a means for cooling the solvent such as cooling coils.

The fractionation of a polyethylene parent polymer into one or more UHMWPE fractions first involves loading the parent polymer into the fractionation system. A mixture of an UHMWPE parent polymer and a solvent is placed in dissolution vessel 14 to dissolve the UHMWPE parent polymer in the solvent. In an embodiment, the amount of the UHMWPE parent polymer contained in the mixture is in the range of from about 7.5 grams/liter of the solvent to about 25 grams/liter of the solvent. As used herein, the UHMWPE parent polymer is defined as a crystalline or semi-crystalline polyethylene that may be a homopolymer or copolymer, may be linear or branched, and has a $M_w$ greater than about 1,000,000 g/mol. In an embodiment further described herein, the parent polymer is an UHMWPE homopolymer. The UHMWPE homopolymer, which has a PDI greater than 2, serves as a "parent" of one or more UHMWPE fractions having a PDI less than about 2. An example of a suitable linear UHMWPE homopolymer for use as the parent of the UHMWPE fractions is GUR4150 Ziegler Natta polyethylene, which is commercially available from Ticona LLC. The physical properties for which are listed in Table 1.

TABLE 1

| Property | Method | Value | Units |
|---|---|---|---|
| Physical Properties | | | |
| Density | ISO 1183 | 930 | kg/m^3 |
| Water absorption (23° C.-sat) | ISO 62 | .01 | % |
| Humidity absorption (23° C./50% RH) | ISO 62 | .01 | % |
| Mechanical Properties | | | |
| Tensile modulus (1 mm/min) | ISO 527-2/1A | 680 | MPa |
| Tensile stress at yield (50 mm/min) | ISO 527-2/1A | 17 | MPa |
| Tensile strain at yield (50 mm/min) | ISO 527-2/1A | 20 | % |
| Nominal strain at break (50 mm/min) | ISO 527-2/1A | >50 | % |
| Tensile creep modulus 1 h | ISO 899-1 | 430 | MPa |
| Tensile creep modulus 1000 h | ISO 899-1 | 220 | MPa |
| Thermal Properties | | | |
| DTUL @ 1.8 MPa | ISO 75-1, -2 | 42 | ° C. |
| DTUL @ 0.45 MPa | ISO 75-1, -2 | 65 | ° C. |
| Vicat softening temperature B50 (50 C./h 50N) | ISO 306 | 80 | ° C. |
| Coeff. of linear therm expansion (parallel) | ISO 11359-2 | 2 | E-4/° C. |
| Electrical Properties | | | |
| Relative permittivity - 100 Hz | IEC 60250 | 2.1 | |

TABLE 1-continued

| Property | Method | Value | Units |
|---|---|---|---|
| Relative permittivity - 1 MHz | IEC 60250 | 3 | |
| Dissipation factor - 100 Hz | IEC 60250 | 3.9 | E-4 |
| Dissipation factor - 1 MHz | IEC 60250 | 10 | E-4 |
| Volume resistivity | IEC 60093 | 1E12 | ohm-m |
| Surface resistivity | IEC 60093 | 1E12 | ohm |
| Electric strength | IEC 60243-1 | 45 | KV/mm |
| Comparative tracking index CTI | IEC 60112 | 600 | — |
| Test Specimen Production | | | |
| Processing conditions acc. ISO | Internal | 11542 | |
| Comp. molding mold temperature | ISO 293 | 200 | ° C. |
| Comp. molding cooling rate | ISO 293 | 15 | °K/min |
| Processing and Delivery Form | | | |
| Injection molding | Internal | No | |

The solvent in which the GUR4150 Ziegler Natta polyethylene is dissolved desirably has a boiling point temperature higher than the melting point temperature of the UHMWPE homopolymer. For UHMWPE having a density in the range of from 0.9564 to 0.9620 g/cc, a melting point temperature in the range of 128 to 132° C., and a crystallinity in the range of from 83 to 85%, examples of suitable solvents include hydrocarbons recovered from petroleum cracking, halo-derivatives of such hydrocarbons, or combinations thereof. The solvent may comprise, e.g., trichlorobenzene (TCB).

To begin the dissolution of the UHMWPE homopolymer in the solvent, a stirring rod or paddle is placed in the dissolution vessel and connected to a stirring motor (not shown). The lid of dissolution vessel 14 is closed, and nitrogen is allowed to flow through the lid into vessel 14 via a nitrogen line. The conditions used to dissolve the UHMWPE homopolymer in the solvent are selected to reduce the degree of degradation of the UHMWPE homopolymer during the dissolution. Otherwise, a particular UHMWPE fraction that it is desirable to isolate might be destroyed during the dissolution. The UHMWPE homopolymer/solvent mixture may be heated to a temperature in the range of from about the melting point temperature of the UHMWPE homopolymer to about less than the boiling point of the solvent, for example to about 30° C. above the melting point temperature of the UHMWPE homopolymer. This heating of the mixture may be achieved by circulating a known heat transfer fluid such as ethylene glycol from heating bath 16 through the jacket of dissolution vessel 14. Heating bath 16 may be heated to the target temperature using, e.g., a heat exchanger. The mixture is also agitated with the stirring rod at a rate of from about 55 rpm to about 65 rpm while it is being heated. The heating and agitation of the mixture may be performed for a period of time effective to dissolve substantially all of the UHMWPE homopolymer in the solvent. In an embodiment, this period of time may be, e.g., at least about 4 days.

The operation of the fractionation system shown in FIG. 1 next involves preheating the fractionation system and loading chase vessel 20 with a solvent, for example by displacing a solvent contained in solvent vessel 24 to chase vessel 20 by operating fractionation pump 26 to pump solvent in the direction toward dissolution vessel 14. This solvent is the same as that used in the UHMWPE parent solution and is heated to a temperature ranging from about the melting point temperature of the UHMWPE to about 160° C. In an embodiment, the solvent is heated above the melting point temperature, for example by heating the solvent in a storage reservoir or by heating the solvent during circulation with heat exchangers or other heating means such as heat tapes disposed along the circulation path. More specifically, the solvent in solvent vessel 24 is pumped via fractionation pump 26 through a suction line 50 and then through lines 54 and 40 to fractionation column 8. It is then pumped through fractionation column 8 to chase vessel 20 via lines 28 and 32. Valves 52, 56, and 34, in lines 50, 54, and 32, respectively, are opened to allow for passage of the solvent while valves 46 and 48 in line 44 and valve 30 in line 28 are closed. The fractionation pump 26 is operated until a desired quantity of solvent is transferred into chase vessel 20 and thereafter shut off. In an embodiment, the solvent is further pumped through line 28 into dissolution vessel 14 via reversing loading pump 18, thereby heating the remainder of the fractionation system and removing air there from. Chase vessel 20, fractionation pump 26, column 8, and loading pump 18, and the lines there between are thus heated by the solvent to a temperature above the melting point temperature of the UHMWPE. In an embodiment, transfer lines (e.g., line 28) for charging polymer from dissolution vessel 14 to column 8 may be heated additionally or alternatively by other heating means, for example via a heating jacket or heating tapes. During loading, fractionation column 8 is also operated at a temperature ranging from about the melting point temperature of the UHMWPE to about 160° C., for example about 30° C. above the melting point temperature. The fractionation column 8 may be further preheated by circulating a heat transfer fluid such as ethylene glycol from heating/cooling bath 12, which is maintained at the desired temperature, via feed line 38, through jacket 10 of column 8. Pre-heating the fractionation system helps prevent cooling of the UHMWPE parent solution, which could result in undesirable early precipitation of the polymer, for example in the transfer lines resulting in plugging.

Upon loading the chase vessel 20 with solvent and preheating the fractionation system, the UHMWPE parent solution may be charged from the dissolution vessel 14 to the column 8. After closing valves 34, 52, and 56, opening valve 30, and slightly cracking valve 46, loading pump 18 may be started. All of the UHMWPE parent solution contained in dissolution vessel 14 is then displaced to the top of fractionation column 8 by pumping the solution through suction line 17 and feed line 28. In this manner, fractionation column 8, which contains a support, is loaded with the UHMWPE parent solution while maintaining its temperature sufficiently high to prevent the polyethylene from precipitating out of the solution. Valve 48 may be opened to allow the hot solvent ahead of the UHMWPE parent solution to flow through line 28, fractionation column 8, line 40, line 42, cooling unit 22, and line 44 to solvent vessel 24. The opening of valve 46 can be controlled to maintain a desired back pressure on the system, e.g., about 3 psig. The pressure of the system may be maintained at about atmospheric pressure or slightly above atmospheric pressure during the production of the UHMWPE fractions. Loading pump 18 may be switched off after loading fractionation column 8 with the UHMWPE parent solution. Solvent from chase vessel 20 may then be introduced via line 32 and valve 34 into column 8.

The fractionation column 8 containing the UHMWPE parent solution may then be operated at conditions effective to cause polymer molecules to precipitate out of the solution and deposit on the support disposed in column 8. In particular, the temperature of fractionation column 8 may be lowered to less than about 40° C. at a rate of from about 1° C./hr to about 0.5° C./hr by cooling heating/cooling bath 12 using, e.g., a heat exchanger (not shown). In an embodiment, computerized control is used to control the cooling rate of the column 8 and the UHMWPE parent solution therein. The support in fractionation column 8 may be a packed bed of relatively small objects having solid surfaces upon which the precipitate can deposit. The support is inert in the presence of the UHMWPE parent solution at the operating conditions of fractionation column 8. Its presence in fractionation column 8 helps distribute the precipitated polymer molecules along the length of the column, thereby preventing the polymer molecules from lumping or globing together. Examples of suitable support materials include glass balls, steel balls, and combinations thereof.

As shown in FIG. 2, chase vessel 20, cooling unit 22, loading pump 18, and the lines associated therewith may be disconnected from the fractionation system after the formation of the precipitate on the support. In addition, a receiving vessel 62 may be connected to the top of column 8 via line 60. Solvent vessel 24 may be filled with a non-solvent, i.e., a liquid in which the UHMWPE is insoluble. Examples of suitable non-solvents include 2-ethyoxy ethanol, 2-butoxy ethanol, ethylene glycol mono-ethyl ether, ethanol, acetone, triethylene glycol, or combinations thereof. Valves 52 and 56 are then opened, followed by running fractionation pump 26 to displace the non-solvent through suction line 50, feed line 54, and fractionation column 8. As a result of this displacement, the solvent used to create the UHMWPE parent solution is washed from fractionation column 8. The non-solvent is further displaced through fractionation column 8 and line 60 to receiving vessel 62. After all of the UHMWPE parent solution is washed from the fractionation system and conveyed to receiving vessel 62, fractionation pump 26 may be turned off.

Figure 3:
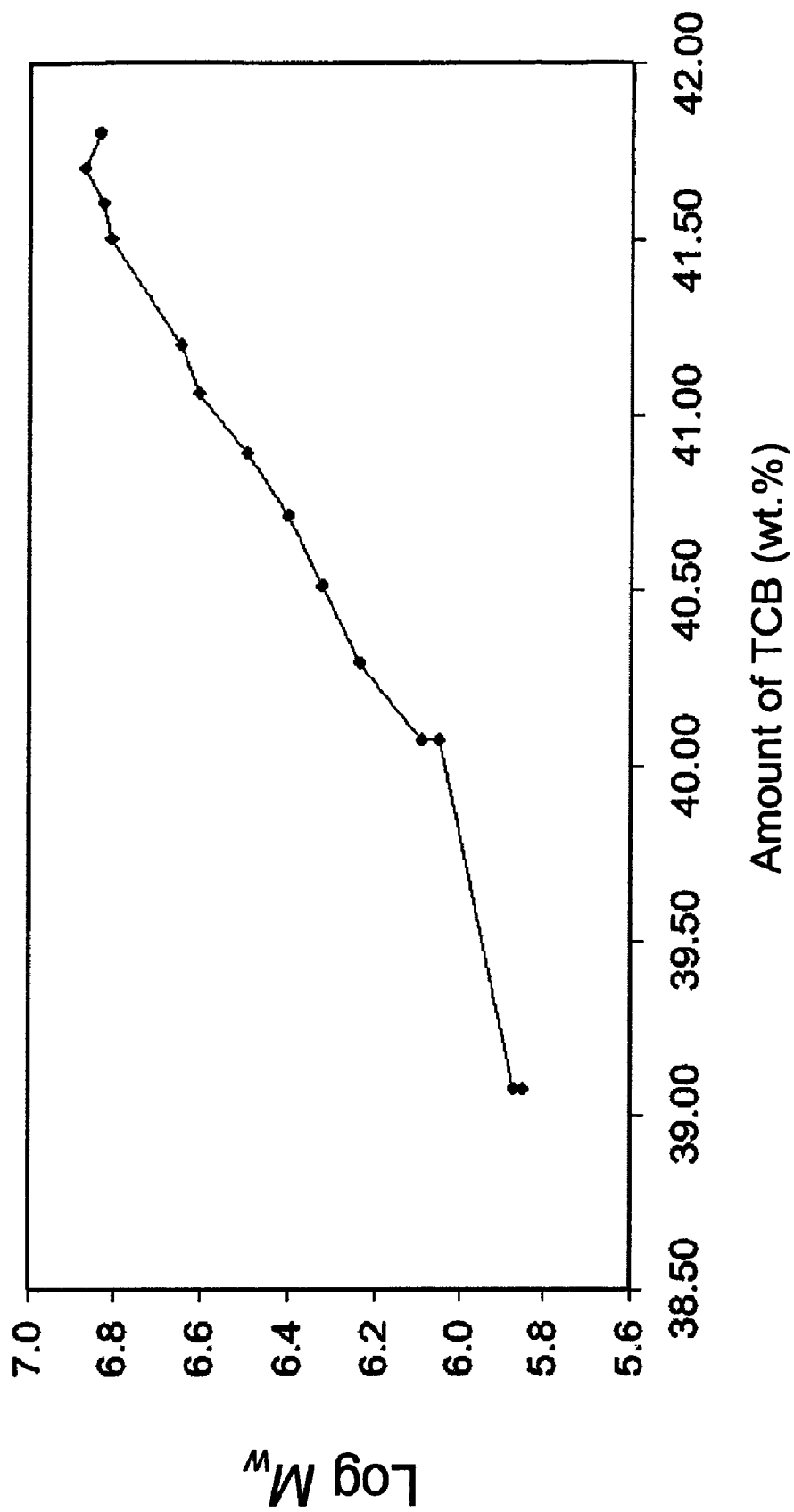
FIG. 3 illustrates a solvent gradient curve used to produce the UHMWPE fraction, wherein the logarithm of the $M_w$ of the UHMWPE fraction is plotted as a function of the amount of TCB solvent in a solvent/non-solvent mixture used to recover the UHMWPE fraction.
Figure 4:
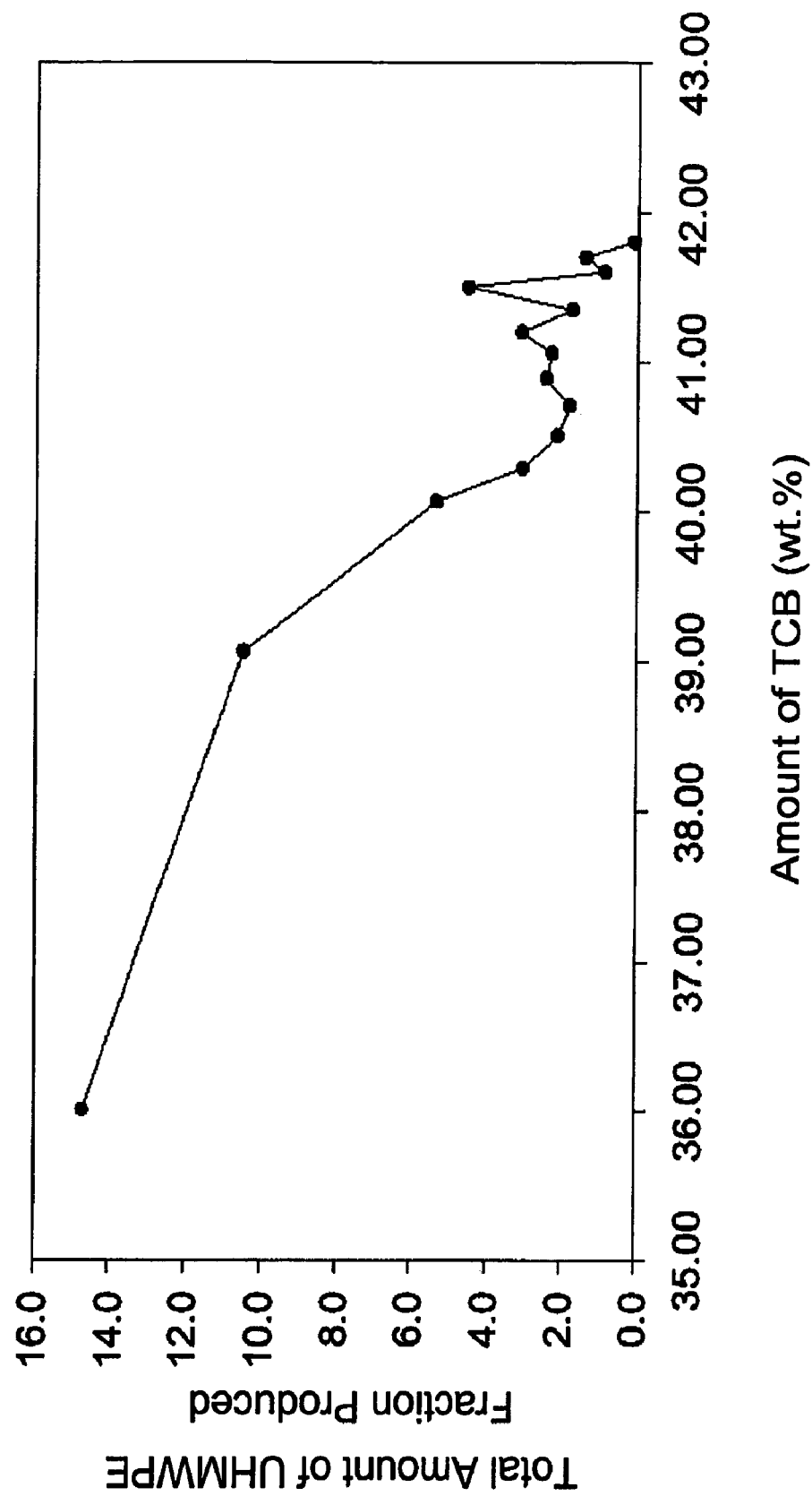
FIG. 4 illustrates a solvent gradient curve used to produce the UHMWPE fraction, wherein the total amount of UHMWPE produced is plotted as a function of the amount of TCB solvent in a solvent/non-solvent mixture used to recover the UHMWPE fraction.

Next, a fractionation technique is employed to recover one or more UHMWPE fractions or cuts from the homopolymer precipitate disposed in the fractionation column 8. The fractionation technique involves at least one and typically a plurality of washing steps wherein the homopolymer precipitate is washed with solvent/non-solvent mixture, wherein each wash is designed to dissolve and thereby isolate a particular UHMWPE fraction. The solvent/non-solvent mixture may then be recovered, and the UHMWPE fraction contained therein precipitated out of the mixture and recovered. By using successive washes with a solvent/non-solvent mixture containing an iteratively increased amount of solvent to non-solvent, a corresponding number of UHMWPE fractions can be recovered. That is, the homopolymer precipitate may be washed with a first solvent/non-solvent mixture corresponding to a first desired UHMWPE cut, after which the homopolymer precipitate may be washed with a second solvent/non-solvent mixture corresponding to a second desired UHMWPE cut, and so forth with the solvent/non-solvent mixtures being recovered between washes and the corresponding UHMWPE fraction precipitated there from. The relative amounts of the solvent and the non-solvent in the first and successive wash mixtures are based on solvent gradient curves for the UHMWPE homopolymer, examples of which are shown in FIGS. 3 and 4 for the GUR4150 UHMWPE homopolymer. In FIG. 3, the logarithm of the $M_w$ of the UHMWPE fraction is plotted as a function of the amount of TCB in the solvent/non-solvent mixture at a temperature of 140° C. In FIG. 4, the amount of the UHMWPE fraction produced is plotted as a function of the amount of TCB in the solvent/non-solvent mixture at a temperature of 140° C. The same solvents suitable for use in the UHMWPE parent solution are suitable for use in the wash mixtures. Also, the same non-solvents suitable for use in washing the solvent from column 8 as those described above are suitable for use in the wash mixtures. In an embodiment, the solvent is TCB, and the non-solvent is 2-butoxy ethanol.

A first solvent/non-solvent mixture corresponding to a first UHMWPE fraction is placed in solvent vessel 24. Subsequent to blending the solvent/non-solvent mixture in solvent vessel 24, the mixture may be displaced into fractionation column 8 via suction line 50 and feed line 54 by operating fractionation pump 26. After pumping the solvent/non-solvent mixture into fractionation column 8, fractionation pump 26 may be turned off and valves 52 and 56 may be closed. Before, during, or after filling fractionation column 8 with the solvent/non-solvent mixture, the temperature of fractionation column 8 may be increased to a temperature ranging from the melting point temperature of the UHMWPE to about 160° C., for example about 30° C. above the melting point temperature by heating the heating/cooling bath 12 using, e.g., a heat exchanger. Fractionation column 8 may be maintained at this temperature for a period of time sufficient to allow the solvent/non-solvent mixture contained therein to reach an equilibrium state at which point the solvent and the non-solvent separate into two phases. In an embodiment, the solvent/non-solvent mixture may be kept in fractionation column 8 for about 16 or more hours. During this period, the first UHMWPE fraction is dissolved in the solvent phase.

The first solvent/non-solvent mixture may be removed and subsequent solvent/non-solvent mixtures may be placed successively in solvent vessel 24 for removing successive cuts from the homopolymer in fractionation column 8. Valves 52 and 56 may be opened and fractionation pump 26 may be operated to displace the second (and successive) solvent/non-solvent mixture into fractionation column 8 while concurrently displacing the first solvent/non-solvent mixture from column 8 to receiver vessel 62 via line 36. This pumping may be performed at a relatively low rate, for example less than about 40 ml/min, to reduce the amount of mixing at the interface between the two mixtures. A precipitating agent capable of causing the first UHMWPE fraction to separate out of the first solvent/non-solvent mixture may be added to receiving vessel 62. Examples of suitable precipitating agents include acetone, $CH_3OH$, and other polar and low boiling solvents. The first UHMWPE fraction recovered from receiving vessel 62 may then be analyzed by GPC to determine its $M_w$, $M_n$, and PDI values.

The process of placing a solvent/non-solvent mixture in solvent vessel 24, displacing the mixture into fractionation column 8, allowing the corresponding UHMWPE fraction to dissolve in the mixture, and displacing the mixture to receiving vessel 62 may be repeated until substantially all the UHMWPE homopolymer precipitate is recovered from column 8. In an embodiment, the amount of solvent employed in the solvent/non-solvent mixture may be increased between washes by selecting an amount that lies on a solvent gradient curve of the UHMWPE fraction. In an embodiment, a washing step may be repeated one or more times with the same solvent/non-solvent mixture to fully isolate a particular fraction before changing the solvent/non-solvent ratio of the wash mixture to isolate another fraction. Likewise, the total number of washing steps and the composition of the corresponding solvent/non-solvent wash mixture may be selected and optimized based upon the starting homopolymer material and the desired polymer fractions to be isolated and recovered there from. The solvent gradient curves, such as those shown in FIGS. 3 and 4, may be developed for a given UHMWPE homopolymer by carrying out the above process over a wide range of solvent concentrations and analyzing the recovered UHMWPE fractions to determine their PDI values. Those fractions having a PDI less than about 2 are then plotted to form the solvent gradient curves for the UHMWPE homopolymer.

Because of the narrow MWD, the various UHMWPE fractions can serve as an excellent reference standard for an analytical instrument or tool used to characterize polymer molecules. The use of such UHMWPE fractions as reference standards improves the accuracy with which the instruments can measure the properties of polymer molecules. With the knowledge of such properties, researchers can better assess, among other things, how to use and optimize the polymers they have developed. For example, the UHMWPE fractions may be used as a reference standard to calibrate size exclusion chromatography (SEC) tools such as a gel permeation chromatography (GPC) tool, providing for a more accurate determination of the $M_w$ of polymer molecules. Additional disclosure regarding GPC can be found in U.S. Pat. No. 6,294,388, which is incorporated by reference herein in its entirety. The UHMWPE fractions may also be used as a reference standard for differential scanning calorimetry (DSC) tool such that the behavior of polyethylene molecules in response to heating can be more accurately determined. Further, the UHMWPE fractions may be used as a reference standard to establish a baseline for linear polymers in rheology measurements using rheology instruments such as a viscometer.

Other examples of analytical tools for which the UHMWPE fractions may be employed as a reference standard include light scattering tools such as a static light scattering (SLS) detector and a dynamic light scattering (DLS) detector. A SLS detector can be used to measure $M_w$ and the radii of gyration ($R_g$) of a polymer in dilute solution. A DLS detector can be used to measure the fluctuations in the scattering signal as a function of time to determine the diffusion constant of polymer chains in dilute solution or of polymer particles in an emulsion. Additional disclosure related to light scattering tools can be found in previously mentioned U.S. Pat. No. 6,294,388 and in Helmstedt et al., 42(9) Polymer, p. 4163-4172 (2001), which is incorporated by reference herein in its entirety. Other analytical tools for which the UHMWPE fractions may be used as a reference standard also can be found in U.S. Pat. No. 6,294,388. It is also contemplated that the UHMWPE fractions could be used in a polymeric material such as a polymer blend to study the effect of high $M_w$ on the properties and/or the processibility of the polymeric material.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

The fractionation system and the general procedure of using the fractionation system described above were employed to produce a plurality of UHMWPE fractions. A cylindrical fractionation column was used containing glass beads as the support and having a height of about 6 feet and a diameter of about ½ foot. First, 60 grams (g) of the GUR4150 UHMWPE homopolymer and 8 liters (L) of inoculated TCB as the solvent were added to the dissolution vessel, which was a 15-L round bottom flask equipped with a stirring rod. The UHMWPE homopolymer/TCB mixture was agitated using the stirring rod for 3 days at a rate of 60 rpm while heating the dissolution vessel at 160° C., thereby causing the UHMWPE homopolymer to dissolve in the TCB and form a UHMWPE parent solution. While pre-heating the fractionation system at 150° C., the parent solution was displaced into the fractionation column using the loading pump. The fractionation column was then cooled slowly at the rate of 0.7° C./hr to a temperature of 40° C., resulting in the precipitation of polymer molecules of different compositions out of the parent solution onto the glass beads. The solvent was then flushed out of the fractionation column by filling the solvent vessel with a non-solvent, i.e., 2-butoxy ethanol, and pumping it through the fractionation column using the fractionation pump. The solvent vessel was a 15-L round bottom flask.

A first TCB (solvent)/2-butoxy ethanol (non-solvent) mixture was subsequently placed in the solvent vessel, followed by pumping the mixture into the fractionation column, thereby displacing the non-solvent from the fractionation column. The amount of TCB in the first mixture (as subsequent mixtures) is set forth in Table 2 and was selected based upon the solvent gradient curves shown in FIGS. 3 and 4. While the first TCB/2-butoxy ethanol mixture was disposed in the fractionation column, the temperature of the column was raised to 140° C. and maintained at that temperature overnight for 15 hours to allow a fraction of the precipitated UHMWPE homopolymer to dissolve in the mixture. Thereafter, another TCB/2-butoxy ethanol mixture having a larger concentration of TCB on the solvent gradient curve than the first mixture was placed in the solvent vessel. The second TCB/2-butoxy ethanol mixture was then displaced into the fractionation column using the fractionation pump such that the first TCB/2-butoxy ethanol mixture was displaced from the column to the receiving vessel. Acetone was added to the receiving vessel to cause the first UHMWPE fraction to precipitate out of the first TCB/2-butoxy ethanol mixture. The first UHMWPE fraction was then isolated from the first TCB/2-butoxy ethanol mixture and analyzed using GPC to determine its $M_w$, $M_n$, PDI, and $M_P$ (i.e., the peak molecular weight). The second TCB/2-butoxy ethanol mixture was also heated at 140° C. in the fractionation column overnight for about 15 hours, to allow more of the second UHMWPE fraction to dissolve in the mixture. The steps of placing a TCB/2-butoxy ethanol mixture in the solvent vessel, displacing the mixture into the fractionation column while concurrently displacing another TCB/2-butoxy ethanol mixture from the column to the receiving vessel for recovery of the UHMWPE fraction, and heating the mixture in the column at 140° C. for 15 hours was repeated until substantially all the UHMWPE homopolymer precipitate had been removed from the column. As shown in Table 2 below, the concentration of TCB, i.e., solvent, in the TCB/2-butoxy ethanol mixture was increased each time the step was repeated. The amount of the UHMWPE fraction recovered with each wash step and the $M_w$, $M_n$, PDI, and $M_p$ of the UHMWPE fraction recovered are also shown in Table 2, wherein RT-35 represents the fraction collected at 35° C. in 100% TCB. As desired, the recovered UHMWPE fractions had $M_w$ values greater than 1,000 kg/mol, with some being higher than 3,000 kg/mol and one being even higher than 6,000 kg/mol. Further, several of the recovered UHMWPE fractions had PDI values less than about 2, with some being as low as about 1.5. Therefore, such UHMWPE fractions would be useful as reference standards for analytical tools such as GPC, DSC, rheology and light scattering tools.

TABLE 2

| Total Amount of GUR-4150 PE Homopolymer Loaded (g) | Conc. of TCB in Solvent/Non-Solvent Mixture (wt. %) | Amount of PE Fraction Produced (g) | Amount of PE Fraction Recovered/ Amount of PE Loaded (%) | Running Total of Conc. of PE Fraction Produced Based on Total Amount Produced (wt. %) | $M_w$ (kg/mol) | Mn (kg/mol) | PDI | Mp (kg/mol) |
|---|---|---|---|---|---|---|---|---|
| 55.4878 | RT-35 | 0.0018 | 0.0032 | 0.0032 | | | | |
| 55.4878 | 36.00 | 14.6767 | 26.4503 | 26.4536 | 1943 | 390 | 4.99 | 1295 |
| | | | | | 2061 | 421 | 4.89 | 1339 |
| 55.4878 | 39.07 | 10.4464 | 18.8265 | 45.2800 | 1619 | 643 | 2.52 | 705 |
| | | | | | 1487 | 478 | 3.11 | 739 |
| 55.4878 | 40.07 | 5.3325 | 9.6102 | 54.8903 | 1612 | 895 | 1.80 | 1106 |
| | | | | | 1437 | 743 | 1.94 | 1221 |
| 55.4878 | 40.29 | 3.0371 | 5.4735 | 60.3637 | 1799 | 919 | 1.96 | 1709 |
| 55.4878 | 40.51 | 2.1059 | 3.7952 | 64.1590 | 2271 | 1509 | 1.51 | 2101 |
| 55.4878 | 40.71 | 1.7981 | 3.2405 | 67.3995 | 2804 | 1933 | 1.45 | 2504 |
| 55.4878 | 40.89 | 2.4069 | 4.3377 | 71.7372 | 3502 | 2236 | 1.57 | 3101 |
| 55.4878 | 41.06 | 2.2792 | 4.1076 | 75.8448 | 4349 | 2332 | 1.86 | 4003 |
| 55.4878 | 41.20 | 3.0639 | 5.5218 | 81.3665 | 5133 | 2717 | 1.89 | 4391 |
| 55.4878 | 41.35 | 1.7177 | 3.0956 | 84.4622 | | | | |
| 55.4878 | 41.50 | 4.5085 | 8.1252 | 92.5874 | 5650 | 2732 | 2.07 | 6412 |
| 55.4878 | 41.60 | 0.8598 | 1.5495 | 94.1369 | 6116 | 3242 | 1.89 | 6664 |
| 55.4878 | 41.70 | 1.3731 | 2.4746 | 96.6115 | 5848 | 2565 | 2.28 | 7343 |
| 55.4878 | 41.80 | 0.0724 | 0.1305 | 96.7420 | 5528 | 2602 | 2.12 | 6794 |
| 55.4878 | 100.00 | 1.2002 | 2.1630 | 98.9050 | 4648 | 2120 | 2.19 | 3046 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymer characterization standard having a polydispersity index less than about 2.3, wherein the polymer characterization standard is a fraction of an ultra high molecular weight polyethylene parent polymer and wherein the ultra high molecular weight polyethylene parent polymer is a copolymer.

2. The polymer characterization standard of claim 1, wherein the ultra high molecular weight polyethylene parent polymer is a crystalline polymer.

3. The polymer characterization standard of claim 1, wherein the ultra high molecular weight polyethylene parent polymer is a semi-crystalline polymer.

4. The polymer characterization standard of claim 1, wherein the ultra high molecular weight polyethylene parent polymer is linear.

5. A polymer characterization standard having a polydispersity index less than about 2.3, wherein the polymer characterization standard is a fraction of an ultra high molecular weight polyethylene parent polymer and wherein the ultra high molecular weight polyethylene parent polymer is branched.

6. The polymer characterization standard of claim 5, wherein the ultra high molecular weight polyethylene parent polymer is a homopolymer.

7. The polymer characterization standard of claim 1, wherein the ultra high molecular weight polyethylene parent polymer has an $M_w$ greater than about 1,000,000 g/mol.

8. The polymer characterization standard of claim 1, wherein the ultra high molecular weight polyethylene parent polymer has an $M_w$ greater than about 3,000,000 g/mol.

9. A polymer characterization standard having a polydispersity index less than about 2.3 and having an $M_w$ greater than about 6,000,000 g/mol, wherein the polymer characterization standard is a polyolefin.

10. The polymer characterization standard of claim 1 having a polydispersity index of less than about 1.5.

11. The polymer characterization standard of claim 5 having a polydispersity index of less than about 1.5.

12. The polymer characterization standard of claim 9 having a polydispersity index of less than about 1.5.

13. The polymer characterization standard of claim 9, wherein the polymer characterization standard is a fraction of an ultra high molecular weight polyethylene parent polymer.

14. The polymer characterization standard of claim 1, wherein the polymer characterization standard is an analytical tool reference standard.

15. The polymer characterization standard of claim 14, wherein the analytical tool comprises a size exclusion chromatography tool, a differential scanning calorimetry tool, a viscosity measuring tool, a light scattering tool, or combinations thereof.

16. The polymer characterization standard of claim 13, wherein the ultra high molecular weight polyethylene parent polymer is a crystalline polymer.

17. The polymer characterization sample of claim 13, wherein the ultra high molecular weight polyethylene parent polymer is a semi-crystalline polymer.

18. The polymer characterization standard of claim 13, wherein the ultra high molecular weight polyethylene parent polymer is a homopolymer.

19. The polymer characterization standard of claim 13, wherein the ultra high molecular weight polyethylene parent polymer is a copolymer.

20. The polymer characterization standard of claim 13, wherein the ultra high molecular weight polyethylene parent polymer is linear.

21. The polymer characterization standard of claim 13, wherein the ultra high molecular weight polyethylene parent polymer is branched.

22. The polymer characterization standard of claim 5, wherein the ultra high molecular weight polyethylene parent polymer has an $M_w$ greater than about 1,000,000 g/mol.

23. The polymer characterization standard of claim 5, wherein the ultra high molecular weight polyethylene parent polymer is a copolymer.

* * * * *